Patented Jan. 5, 1926.

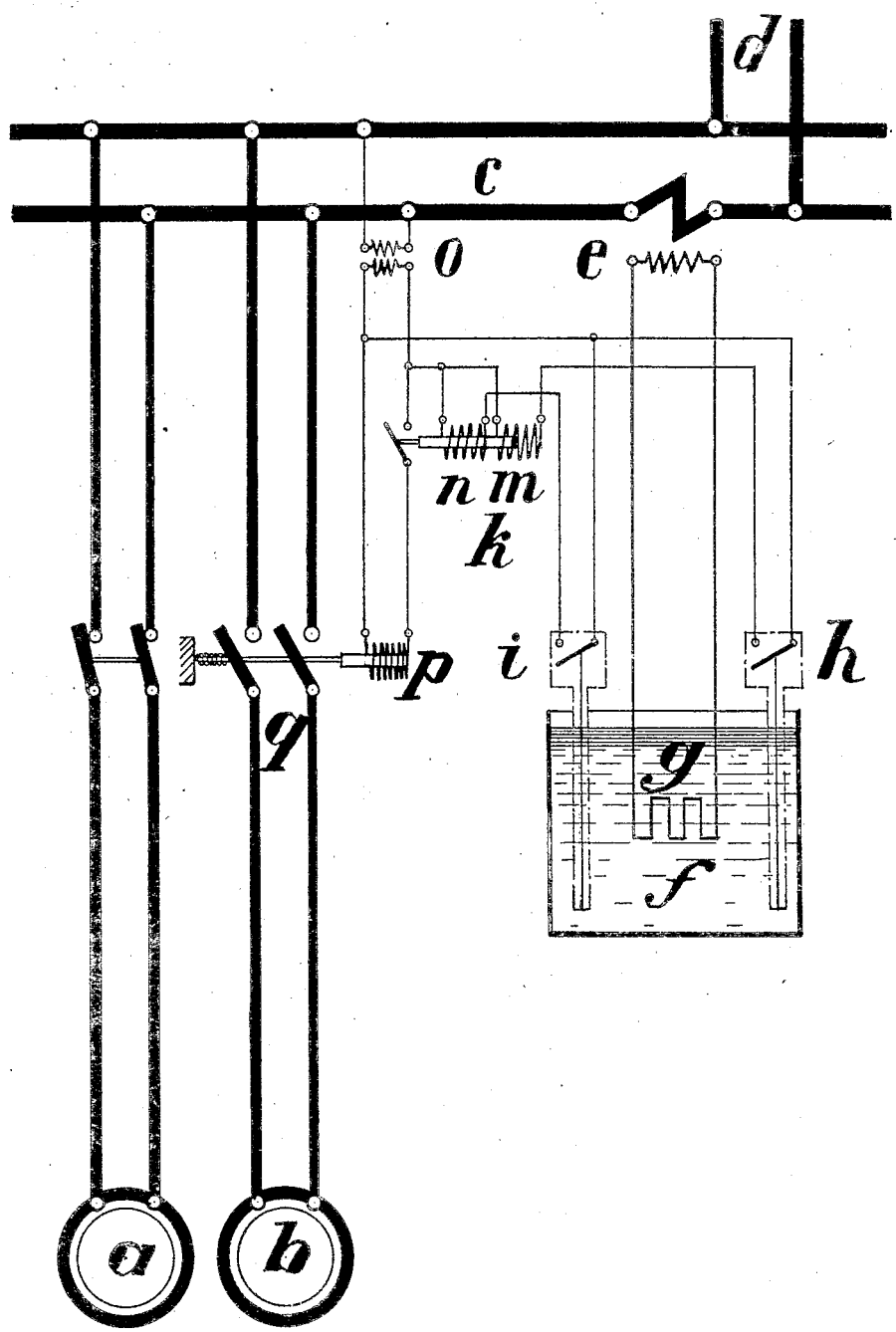

1,568,474

UNITED STATES PATENT OFFICE.

FRITZ SCHMIDLIN, OF BADEN, SWITZERLAND, ASSIGNOR TO AKTIENGESELLSCHAFT BROWN, BOVERI & CIE., OF BADEN, SWITZERLAND.

APPARATUS FOR EFFECTING THE AUTOMATIC CONNECTING AND DISCONNECTING OF ELECTRICAL MACHINE UNITS.

Application filed August 7, 1922. Serial No. 580,263.

*To all whom it may concern:*

Be it known that I, FRITZ SCHMIDLIN, a citizen of the Swiss Republic, residing at No. 46 Badstrasse, Baden, Switzerland, have invented certain new and useful Improvements in Apparatus for Effecting the Automatic Connecting and Disconnecting of Electrical Machine Units, of which the following is a specification.

In electric power installations and sub-stations it has hitherto been left to the service staff to connect in a further machine unit, converter unit, rectifier unit or transformer unit in the case of a determined network load being exceeded, and to disconnect the said unit again when the network load drops below a determined amount.

According to the present invention these connecting and disconnecting operations are effected in dependence upon the network current automatically by means of thermal relays which are energized by the heating due to the network current, and which influence the device for connecting and disconnecting the relieving unit.

This subject matter of this invention will now be more particularly described in its application by way of example to an alternating current sub-station whereof the switch connections are illustrated in the accompanying drawing.

The two machine units $a$ and $b$ of which only $a$ is at first assumed to be connected, feed the network $d$ through the bus bars $c$. The network current is transmitted through a transformer $e$ to a heating resistance $g$ situated in the oil tank $f$. In the same oil tank there are situated also two thermal relays $h$ and $i$ which become energized at different temperatures.

First the relay $h$ closes its contact at a predetermined temperature and thereby brings the holding coil $m$ of the relay $k$ into circuit. The switch incorporated in the relay $k$ is arranged so that it normally has a tendency to open. The coil $m$ alone is not strong enough to close the switch of the relay $k$. At a predetermined greater load and consequent higher temperature of the oil bath $f$, the temperature-relay $i$ comes into operation; the switching-in coil $n$ is then energized by the auxiliary source $o$ of current; and together with the coil $m$ closes the switch of the relay $k$. The switch $q$ is then closed by the switching-in magnet $p$, and thereby the second machine $b$ is connected in.

If the total load in $d$ drops to such a degree as to allow of disconnecting a unit, the temperature of the oil in the tank $f$ will fall, and at first the switch of the temperature-relay $i$ which is set to the higher temperature will open. But the removal of the magnetizing force of the coil $n$ does not re-release the switch $k$, which does not open until the temperature has fallen below the degree for which the second relay $h$ has been set. When the contact of the relay $h$ is opened the coil $p$ is de-energized and the machine $b$ is disconnected from the bus-bars by the opening of the switch $q$.

The oil bath $f$ together with the devices $g$ $h$ $i$ is so proportioned that it has approximately the same temperature time curve as the machine $b$ which is to be connected in by it. The desired adjustment can be effected by proportioning the quantity of oil, the shape and heat insulation of the oil vessel, the proportioning of the heating resistance $g$, and the adjustment of the relays $h$ and $i$. These relays are operated by vertical rods, the linear expansion of which closes a switch and adjustment of the relay may be varied by using different lengths of operating rods, by using materials for the rods having different coefficients of expansion, or by adjusting the positions of the fixed contacts of the switches.

The relays $h$ and $i$ may, as a simpler form, be constituted as well-known contact thermometers in which case adjustment may be arranged by varying the position in the thermometer tube of the active contact.

According to the choice of the temperature-difference for which the two relays are set it is possible to determine the time of the connecting in and the time of the starting of the operation of the relieving unit $b$. The use of two relays $h$ and $i$ set to different temperatures is necessary in practice because otherwise, that is to say, when using only a single temperature relay, an oscillation of the load round about the point of setting of the temperature relay would have as its consequence a continual connecting and disconnecting of the relieving unit $b$. Certainly this might be effected also with one relay and a mechanical or thermal retarding device, but the herein described solution of the problem seems to be the simplest.

It is to be understood that the improved apparatus can also be used with direct current and with polyphase alternating current.

The improved apparatus can also be suitably designed for the purpose of connecting and disconnecting additional relieving units, in any desired sequence, or dependent upon the total network load.

In converter installations and transformer stations the improved apparatus may be located either on the primary side or on the secondary side; and in rectifier installations it may be located on the direct current side or on the alternating current side.

The supply of current for the connecting and disconnecting devices need not be taken through an auxiliary transformer (o). It may be taken from a source of current, independent of the net work, for instance, a battery.

The machines to be connected and disconnected may be separated from one another. It is even possible to imagine the case where entire power installations or sub-stations situated at a distance may be coupled up automatically by means of the improved apparatus for the purpose of serving as a relieving unit in the sense of the present invention.

What I claim is:—

1. In an apparatus for effecting the automatic connecting and disconnecting of electrical machine units, the combination, with a network, bus-bars feeding said network, an electrical machine unit normally connected to said bus-bars, a relieving unit intended to be connected to help said normal machine when the network load exceeds a predetermined amount, and to be disconnected when the network load drops below a predetermined amount, leads connecting said relieving unit to said bus-bars, and a switch located in said leads, of two thermal relays means for exposing said relays to the heating effect of the network current, one relay controlling the closing and the other controlling the opening of the switch, and means connecting said termal relays to said switch, whereby said relieving unit is connected to and disconnected from the network circuit, according as the network load exceeds or drops below a predetermined amount, the connecting in of said relieving unit being effected by the occurrence of a larger network current or higher heating effect of the network current than the corresponding limits at which said relieving unit is disconnected.

2. In apparatus comprising the combination claimed in claim 1, in which the means for exposing said relays comprises a liquid bath, and means for heating said bath by the network current, said thermal relays being immersed in said bath.

3. In apparatus comprising the combination claimed in claim 1, in which the means for exposing said relays comprises a liquid bath and means for heating said bath according to approximately the same temperature-time curve as said relieving unit, said thermal relays being immersed in said bath.

4. In apparatus as claimed in claim 1, in which the means for exposing said relays comprises a single liquid bath containing the two said thermal relays, one of said relays being arranged to operate at a higher temperature than the other.

5. In apparatus as claimed in claim 1, in which the means for exposing said relays comprises a single liquid bath containing the two said thermal relays, one of said relays being arranged to operate at a higher temperature than the other and means whereby the difference between the operating temperatures of said relays may be adjusted at will.

6. In apparatus as claimed in claim 1, in which the means for exposing said relays comprises a single liquid bath containing the two said thermal relays, one of said relays being arranged to operate at a higher temperature than the other and a switch electromagnet comprising two coils, one of which is a holding coil controlled by the thermal relay which operates at the lower temperature and the other a switching-in coil controlled by the thermal relay which operates at the higher temperature.

In testimony whereof I have signed my name to this specification.

F. SCHMIDLIN.